INVENTORS
Donald Bentley Murph
Jack L. Pinkston

INVENTORS
Donald Bentley Murph
Jack L. Pinkston

BY

ATTORNEYS

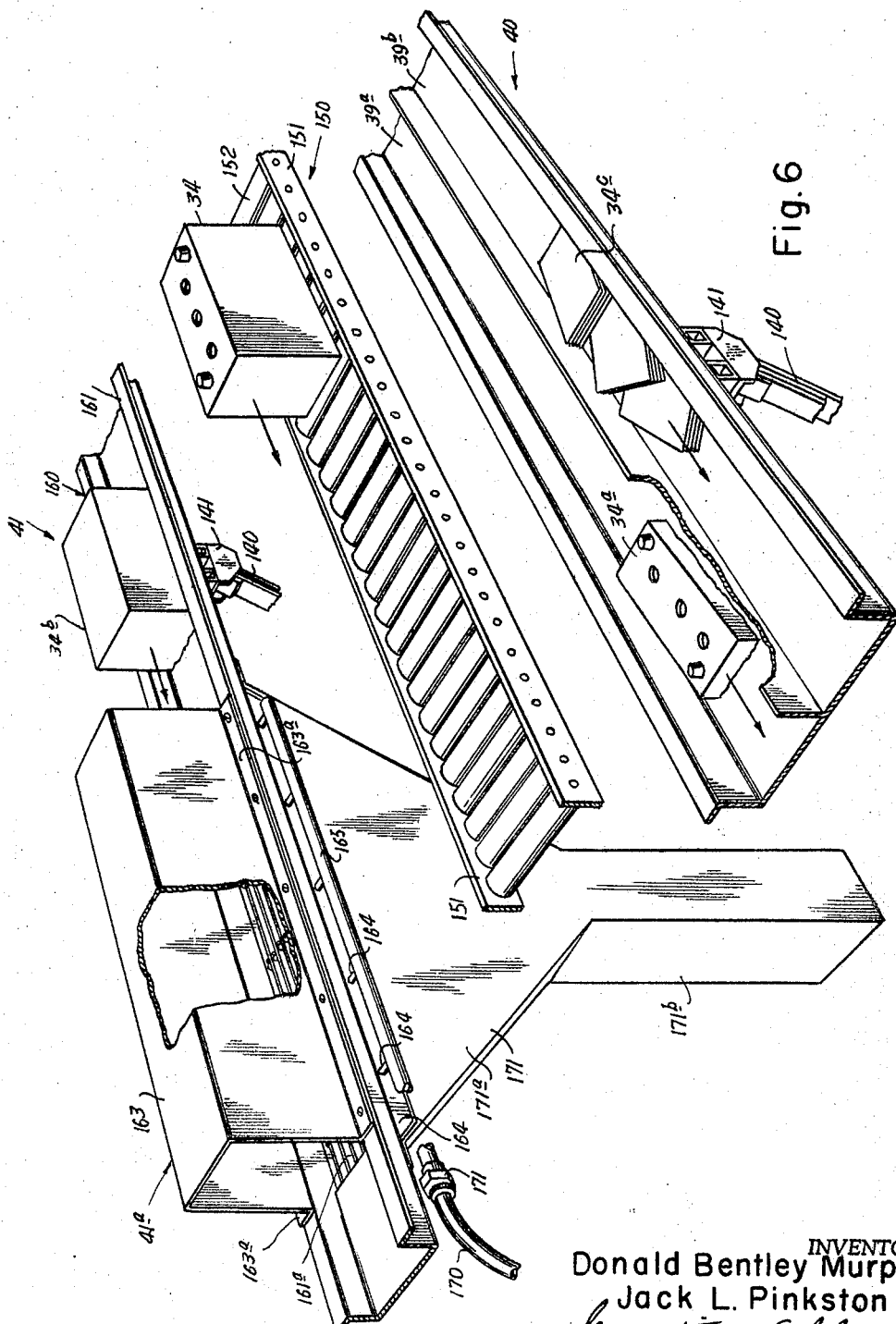

United States Patent Office 3,453,150
Patented July 1, 1969

3,453,150
BATTERY SALVAGING APPARATUS
Donald Bentley Murph and Jack L. Pinkston, Dallas, Tex., assignors to Southern Lead Company, Dallas, Tex., a corporation of Texas
Filed Nov. 4, 1966, Ser. No. 592,039
Int. Cl. H01m 47/00
U.S. Cl. 136—174                    14 Claims

ABSTRACT OF THE DISCLOSURE

Apparatus for cutting a top portion of a storage battery case from the remainder thereof for salvaging metals and other valuable materials of said battery. The battery is disposed on its side on a tray at a position determined by a stop means and a blade in swung through an arcuate path to sever the top, permitting the severed top to drop to a conveyor. The opened case is then inverted over another conveyor to dump the plates and other loose material out of the case, and the case is then placed on a shaker washer conveyor for removal of all chemicals from within the case. Safety control means is provided to inhibit injury to the operator.

---

This invention relates to salvaging apparatus and methods and more particularly relates to apparatus and methods for salvaging materials from storage batteries including means for dismembering storage battery cases.

It is one object of this invention to provide salvaging apparatus and methods.

It is a principal object of this invention to provide a method and apparatus for opening and removing salvageable materials from a storage battery.

It is a further object of the invention to provide a method and apparatus for severing a portion of a wet cell battery case to permit removal of the battery plates therefrom.

It is a still further object of the invention to provide apparatus and a method for removing salvageable materials from a wet cell type battery, cleaning the battery case, and conveying the battery case, severed top, and removed plates toward sites for further processing and disposal.

It is another object of the invention to provide apparatus for cutting a top portion from a wet cell type battery case.

It is a still further object of the invention to provide a battery case opener including means for supporting a battery case and blade means adapted to cut off a top portion of the case.

It is still another object of the invention to provide a battery case opener including means for supporting a battery case, a hydraulically actuated blade for cutting through the case and means for receiving the severed portions of the battery case and the plates removed from within the case.

In accordance with a further object of the invention a method of salvaging materials from a storage battery includes conveying the battery to a predetermined location, severing a top portion of the battery case, removing the plates and other salvageable materials from the case; conveying the severed tops, plates, and other removed materials to locations for processing and disposal, conveying the empty case to washing means, washing the case to remove battery acid and other materials from the case, conveying the cases to a disposal area, and processing the acid and other materials washed from the case to recover valuable materials.

It is another object of the invention to provide a battery case opener having a blade movable through an arcuate path on both its cutting and return strokes.

It is a further object of the invention to provide a blade in a battery case opener which moves through an arcuate cutting path beyond a vertical position of parallel relationship of the blade with an adjacent spaced stop member so that during its return stroke the blade moves upwardly away from the severed top portion of the battery case to minimize any tendency toward wedging or sticking of the severed top portion thereby freeing the blade during its return stroke and more quickly releasing the severed portion of the battery case from between the blade and battery stop.

It is a further object of the invention to provide a battery case opener having a frame mounted blade wherein the frame moves beyond a horizontal position during its downward cutting stroke.

Additional objects and advantages of the invention will be readily apparent from the reading of the following description of a device constructed in accordance with the invention, and reference to the accompanying drawings thereof, wherein:

FIGURE 6 is a fragmentary, partially cutaway, perspective view of conveying and cleaning assemblies of the battery case opener;

Figure 1:
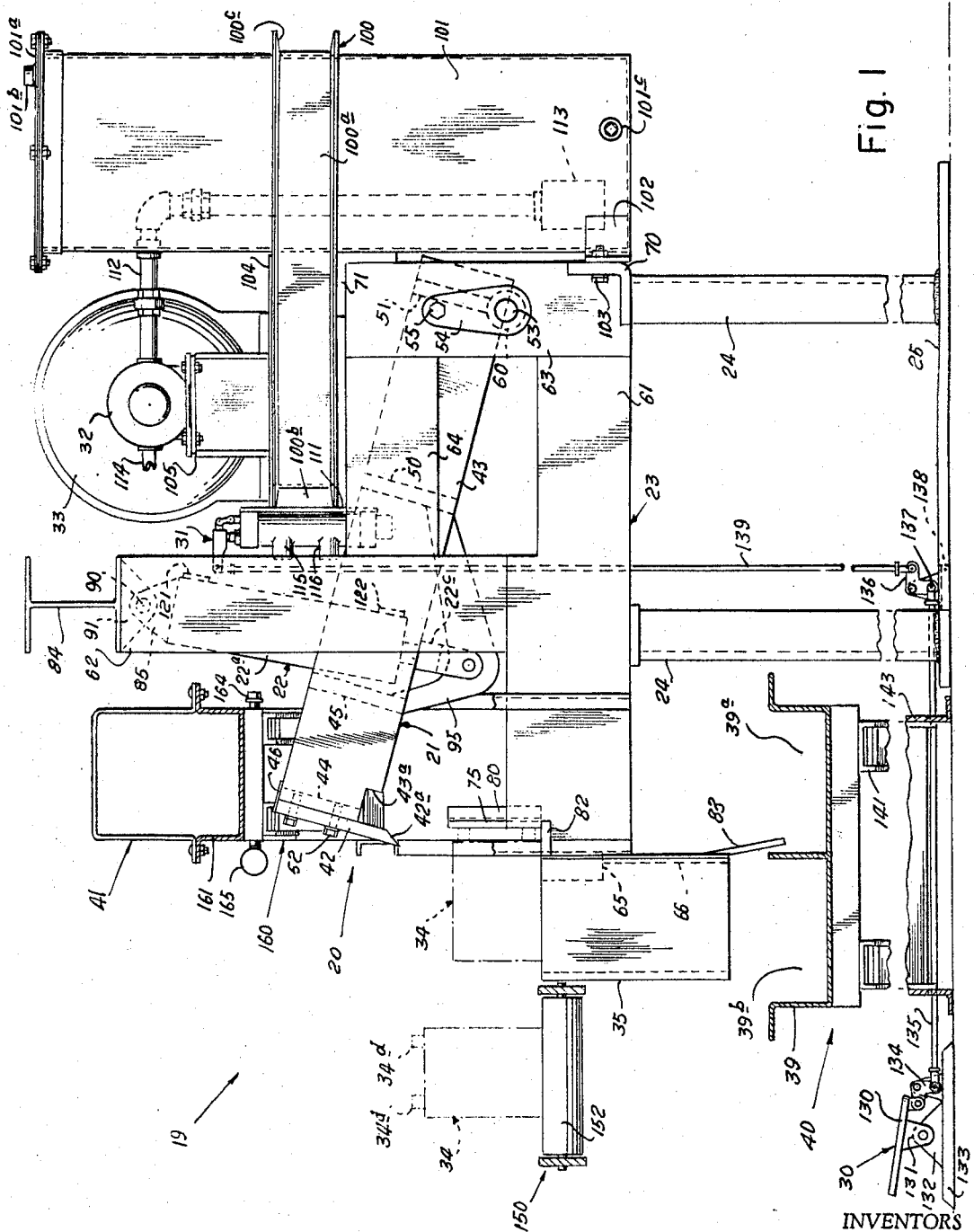
FIGURE 1 is a side view partially in elevation and partially in section of a preferred form of battery case opener embodying the invention.

Referring to FIGURES 1–6 a battery opener 19 embodying the invention comprises a cutting unit 20 having a blade assembly 21 actuated by a hydraulic power unit 22 comprising a cylinder 22a, a piston 22b, and a piston rod 22c. The blade assembly and hydraulic unit are supported from a frame 23 supported on vertical legs 24 the lower ends of which rest on supporting plates 25. The hydraulic unit is operable responsive to a foot pedal assembly 30 controlling a valve 31 which directs fluid under pressure to the hydraulic unit from a pump 32 driven by a motor 33. The hydraulic unit forces the blade assembly downwardly so that a battery case 34 is cut severing its top portion 34a from its main body portion 34b. During the cutting of the battery case, it is supported on a knock-out tray 35 secured to the frame 23. After the top portion 34a of the battery case is severed it falls into a channel portion 39a of a trough 39 of a conveyor 40 after which the battery case body is manually lifted and rotated to dump the plates 34c, FIGURE 6, downwardly through the knock-out tray into a channel portion 39b of the trough. The body portion of the battery case is lifted to another conveyor 41 including a washing device 41a where the case is washed to clean it and transport it to a disposal area, not shown.

Figure 4:
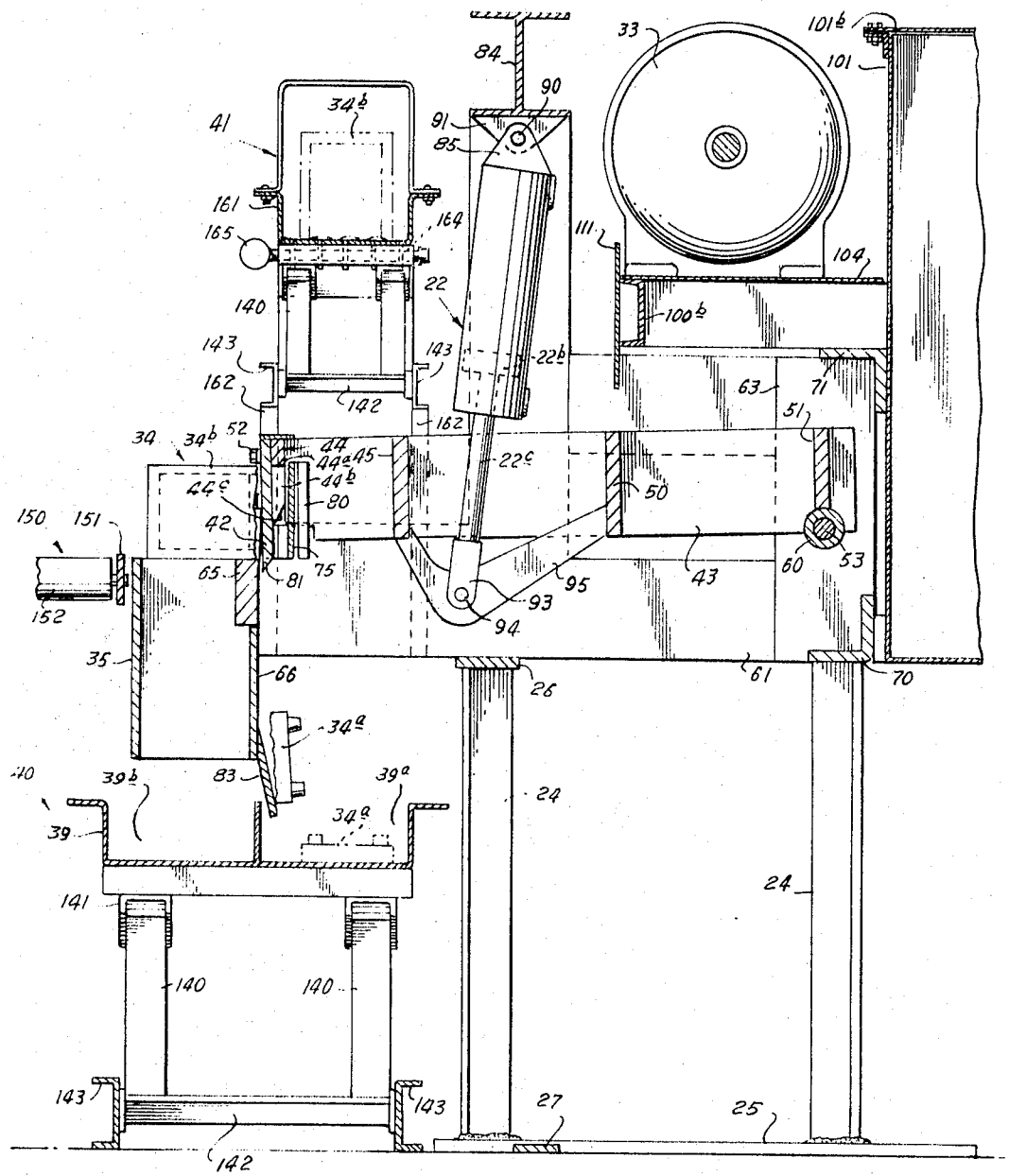
FIGURE 4 is a fragmentary side view partially in section and partially in elevation along the line 4—4 of FIGURE 2.

The blade assembly 21 includes a blade 42 having a beveled lower cutting edge 42a secured on a rectangular frame comprising a pair of spaced parallel side members 43 connected, as by welding, with a plurality of cross members 44, 45, 50 and 51. The blade 42 is removably secured to the member 44 by a plurality of bolts 52 so that when its edge 42a is dulled the blade is readily replaceable. The three components of the member 44 define a U-shaped structure including a cross bar 44a and legs 44b which extend downwardly defining a downwardly opening recess so that as the blade 42 cuts downwardly into a battery case clearance is provided behind the blade for the top portion 34a of the battery case allowing the blade to make a full cut through the case and permitting the top portion of the case to be received behind the blade from which position it drops downwardly, FIGURE 4, after being completely severed from the case. As shown in FIGURE 4, the bottom edge surface of each portion 44b is tapered along its surface 44c slanting toward the back face of the blade. The bolts 52 are threaded into the portions of the member 44 for holding the blade in position on its frame. Each of the side members 43 of the blade assembly is reduced in height along its front free-end portion to define in combination with the back face of the blade 42 a downwardly opening rectangular recess or slot 43a providing clearance to permit the blade assembly to move to the lower end of its cutting stroke, FIGURE 4, as explained hereinafter.

The blade assembly 21 is pivotally supported from the frame 23 on a shaft 53 which is secured at each of its ends in a member 54. Each end portion of the shaft extends through the frame 23 and is secured as by welding to a member 54. Each of the members 54 is held against rotation along the outside surface of the frame 23 by a bolt 55 threaded into the frame so that the shaft does not rotate relative to the frame and thus there is no shaft wear where it passes through the side portion of the frame. The shaft 53 is received through a tubular sleeve member 60 secured along its outside surface to the bottom edge of the blade frame cross member 51 which is somewhat narrower in height than the cross members 45 and 50. The sleeve 60 is substantially the same length as the cross member 50 extending between the inside surfaces of vertical side portions of the frame 23. The sleeve 60 rotates on the shaft 53 to permit the blade assembly 21 to pivot on the shaft for cutting battery cases. Substantial bearing surface is provided beween the shaft and the sleeve 60. The axis of the shaft 53 is preferably aligned parallel to the longitudinal centerline of the top surface of a battery case 34 between the terminals when the case is positioned for cutting as in FIGURE 1. Also the axis of the shaft is preferably at substantially the same height as such centerline.

The frame 23 includes vertical side portions in parallel spaced relation and each comprising a lower horizontal member 61, a front vertical member 62, and a back vertical member 63 between which an upper horizontal member 64 is secured parallel to and spaced from the lower horizontal member. The horizontal and vertical members of the side portions of the frame are suitably interconnected as by welding.

Figure 2:
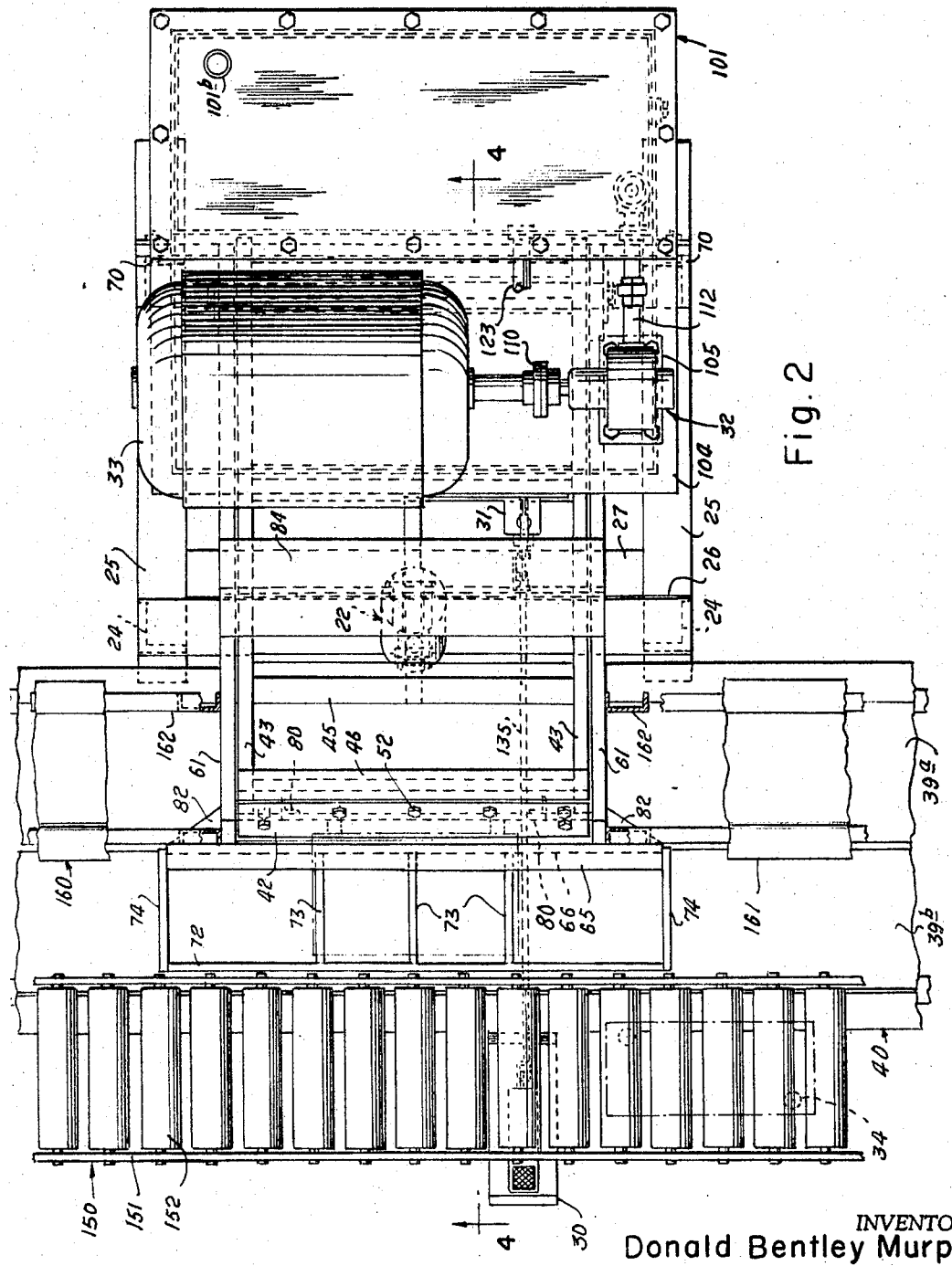
FIGURE 2 is a fragmentary top view of the battery case opener of FIGURE 1.

The front edges of the frame members 61 are interconnected by a cross bar 65 and a plate 66 secured across the front edge surfaces of the members 61 immediately below the cross bar. As shown in FIGURE 2 the cross bar and plate extend in each direction beyond the outside surfaces of the side members 61 forming the back wall structure of the knock-out tray 35. The cross bar 65 is substantially thicker than the blade 66, FIGURE 4, as it is positioned immediately below and supports the battery case 34 over the area of greatest impact when the blade 42 is forced downwardly against the battery case. A horizontal angle bar 70 extends between the back vertical frame members 63 parallel to the front cross member 65. Another horizontal angle bar 71 connects the frame members 63 along their top and upper back edge surfaces parallel to the lower angle bar 70.

The knock-out tray 35 has a front plate 72 connected with the cross bar 65 and the plate 66 by a plurality of parallel, spaced, internal cross plates 73 and opposite end plates 74. The knock-out tray, along the upper edge surfaces of its plates 72 and 73 and cross bar 65, supports a battery case 34 while the top portion of the case is severed by the blade 42.

Figure 3:
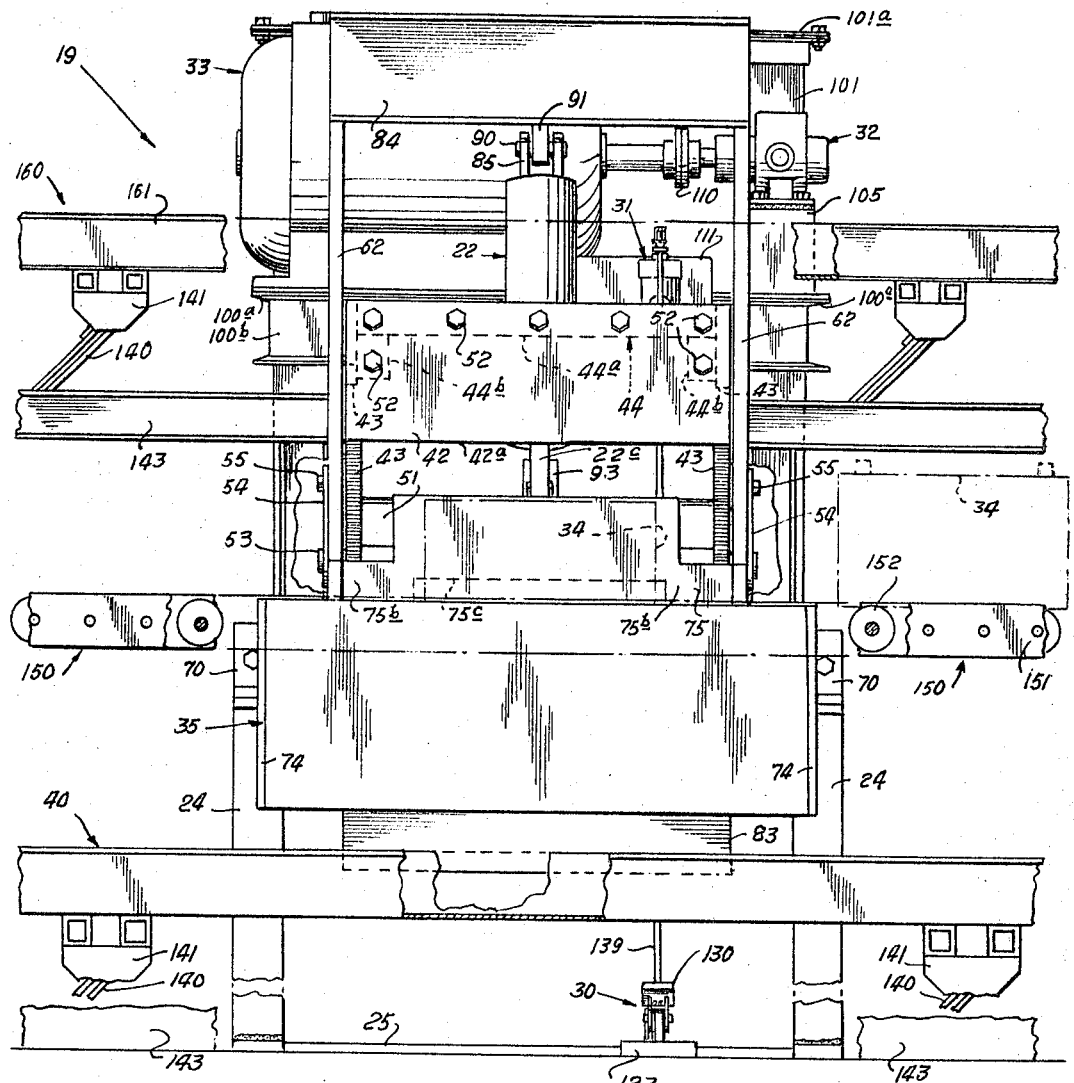
FIGURE 3 is a fragmentary front view in elevation with some portions cut away of the battery opener of FIGURES 1 and 2.

A stop plate 75 is secured along its opposite end edges to the inside surfaces of the spaced side members 61 of the frame 23. The stop plate is reduced in width along an upper portion 75a which is received between the side members 43 of the blade assembly when the blade is moved downwardly through its cutting stroke. At the lower end of the blade cutting stroke, FIGURE 4, the reduced height end portions 75b of the stop plate each are received within the slot 43a of the adjacent side member 43 of the blade assembly permitting the side members to pass downwardly over the stop plate far enough for the blade to move fully through its cutting stroke. As best shown in FIGURE 3, the stop plate has a rectangular downwardly opening slot 75c which is larger than the battery case 34 to provide more clearance to allow the top of the battery case to fall downwardly after it is cut from the body portion of the case. The stop plate is reinforced by a pair of vertical spaced parallel angle bars 80 secured along the back face of the plate. As best illustrated in FIGURE 1, the stop plate limits the movement of a battery case so that the case is properly positioned to be cut by the blade 43. The front surface of the plate 75 facing the knock-out tray is engaged by the end surfaces of terminals 34c on a battery case to properly position the case on the knock-out tray. The slot 75c of the stop plate 75 along with the upper back edge of the cross bar 65 define an opening or slot 81 communicating from the top surface of the knock-out tray downwardly through the frame 23 so that when the top portion 34a of a battery case is cut from the case body by the blade 42 it falls downwardly into the channel 39a of the conveyor 40, FIGURE 4. Triangular shaped reinforcing plates or webs 82 are secured along a front edge to the back vertical surface of the cross bar 65 and along an inside edge of the outside vertical side surface of each of the side members 61 of the frame 23. The webs 82 increase the rigidity of the frame 23 and the knock-out tray and more securely connect the knock-out tray with the frame. A deflection plate 83 is secured to and extends downwardly and backwardly from the back surface of the plate 66 to deflect battery case top portions 34a falling downwardly through the slot 81 into the channel 39a of the conveyor 40.

The upper ends of the forward vertical side members 62 of the frame assembly 23 are interconnected by an I-beam 84 which serves the functions of both rigidly interconnecting the frame members in spaced parallel relationship and supporting the hydraulic unit 22 which has an upper forked member 85 pivotally connected by a bolt 90 to a bracket 91 extending downwardly from and centrally positioned along the length of the I-beam. The piston rod 22c has a forked end portion 93 pivotally connected by a pin 94 on a bracket 95 secured between the cross members 45 and 50 of the blade assembly 21 so that the blade assembly is moved through its cutting and return strokes by the piston rod.

A rectangular frame 100 formed of side channel members 100a and front and back channel members 100b and 100c, respectively, is secured on the angle member 71. The side channel members 100a are connected as by welding to the angle members 71 extending perpendicular to the angle members in parallel spaced relationship with respect to each other. A tank 101 for hydraulic fluid is secured near its mid-portion within the side and back channel members 100a and 100c, respectively, and is secured at its front lower end to the lower channel bar 70 by L-brackets 102 which are each connected with the channel member 70 by a bolt 103. Each bracket 102 is welded to the adjacent side panel of the tank. A tank 101 includes a top 101a having a capped filler opening 101b and a lower drain plug 101c. In front of the tank 101 a base plate 104 is secured on the side channel members 101a extending between the channel members providing a mounting base for the pump 32 and its motor 33. The pump is supported from the base plate on a mounting assembly 105. The pump and motor shafts are interconnected by a suitable conventional coupling 110. The hydraulic valve 31 is supported from a vertical mounting plate 111 secured on the front channel member 100b.

The intake side of the pump 32 is connected by a conduit 112 into the tank 101. The intake end of the conduit 112 has a conventional strainer 113 for keeping foreign matter out of the pump and hydraulic valve. The outlet side of the pump 32 is connected by a conduit 114 to the valve 31 for supplying hydraulic fluid through the valve to the hydraulic unit 22 for moving the blade assembly through its cutting and return strokes. The conduit 114 is connected to an inlet fitting, not shown, on the valve 31. The valve 31 has fittings 115 and 116 which are connected by flexible hoses 117 and 118 to fittings 121 and 122, respectively, of the cylinder 22a for the supply and return of hydraulic fluid between the valve 31 and the hydraulic unit. Each of the conduits 117 and 118 functions as either a supply or a return line depending upon whether the hydraulic unit is moving the blade through its cutting or return stroke. For example, the hose 117 between the valve fitting 115 and the cylinder fitting 121 functions to supply hydraulic fluid from the valve to the cylinder when the blade is moving through its cutting stroke and returns hydraulic fluid from the cylinder to the valve during the return stroke of the blade. While one of the hoses supplies fluid to one end of the cylinder, the other hose is returning fluid from the other end of the cylinder. A hydraulic return line 123, FIGURE 2, is connected between the tank and the valve 31 so that as hydraulic fluid is pumped into the one end of the cylinder the fluid from the other end of the cylinder is returned through the valve to the tank.

The valve 31 is controlled by the operator of the battery case opener through a foot pedal assembly 30. The foot pedal assembly includes a foot pedal 130 pivotally interconnected through brackets 131 and 132 with a base plate 133. The foot pedal is pivotally attached to a bell crank 134 which is secured to and operates a horizontal push rod 135. A bell crank 136 connected to the other end of the push rod 135 is pivotally supported from a bracket 137 mounted on a base plate 138. The bell crank 140 is in turn pinned to one end of a vertical push rod 139 which is pivotally secured at its other end to an operating lever of the valve 31.

Figure 5:
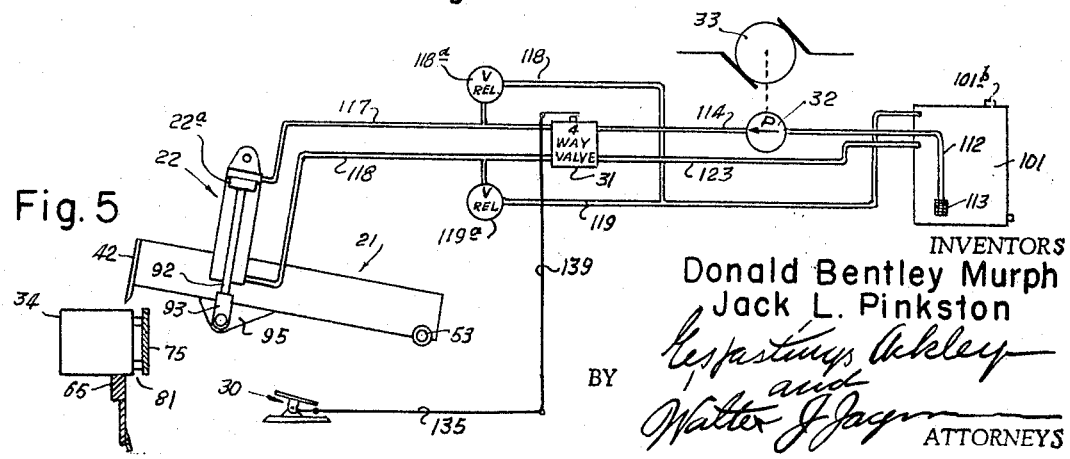
FIGURE 5 is a schematic representation of the hydraulic power system of the battery opener.

As shown in FIGURE 5, a conduit 117a including a relief valve 117b is connected into the hose 117 between the valve 31 and the cylinder 22a to bypass hydraulic fluid back to the tank 101 when the pressure in the line 117 exceeds a predetermined value. Similarly, a conduit 118a having a relief valve 118b is connected into the hose 117 between the valve 31 and the cylinder. The conduits 118a and 117a connect into a conduit 119 leading back to the tank 101 to return hydraulic fluid from either of the conduits 117a and 118a to the tank.

The valve 31 is a conventional four-way, two position, valve for controlling fluid flow along selected paths between the pump 32, the tank 101, and the power unit 22. The valve is spring biased to a predetermined first position which in the present form of the invention is a position establishing the conduit 118 as a supply line from the valve and the conduit 117 as a return to the valve so that the blade assembly is held at its upper position, FIGURE 1. Depression of the free end of the foot pedal 130 by an operator moves the valve 31 to a second position at which the conduit 118 is a return line from the piston assembly and the conduit 117 is a supply line so that the piston 22b is forced downwardly to move the blade through its cutting stroke while fluid in the lower portion of the cylinder below the piston is returned through the line 118, the valve 31, and the line 132 to the tank. Thus, the valve 31 serves to selectively communicate the pump supply line 112 and the return line 123 with the lines 117 and 118 between the valve and hydraulic unit depending upon whether the blade assembly is to be moved through its cutting or return stroke. The pump 32 is a conventional centrifugal type pump, one particular model of which was a GERATOR Model H8F10–A1 having an output of ten gallons per minute at the desired pressure.

The conveyor 40 for the severed battery case top 34a, the battery plates 34c, and other materials from the case, FIGURE 6, is a commercially available vibrating conveyor of the general type illustrated and described in Catalogue 1004, Jeffrey Manufacturing Company, Columbus, Ohio. The conveyor generally comprises a trough structure 39 having longitudinal sections 39a and 39b, FIGURES 4 and 6, supported on and longitudinally vibratable by leaf-spring-like vibrating bars 140 each secured between a bracket 141 on the bottom side of the trough and a horizontal cross brace 142 connected between parallel spaced horizontal channel base members 143. The vibrator bars slope from the channel members 143 to the trough in a direction opposite to the direction of movement of the battery tops and plates in the sections of the trough. The trough is connected with a power unit, not shown, which vibrates the trough both longitudinally and vertically at a high rate of speed moving the trough simultaneously upwardly and in the direction of movement of the materials on it and returning the trough backwardly and downwardly. The materials on the conveyor, such as the battery tops and plates, are momentarily in suspension at the end of each forward stroke and thus do not return backwardly with the trough but rather fall under the force of gravity at their advanced position on the trough. Repeated high speed cycles of the trough in this manner convey the tops and plates continuously and uniformly in the direction of the forward and upward movement of the trough.

Battery cases which are to be processed are moved to the cutting unit 19 on a roller type conveyor 150 comprising parallel spaced side bars 151 supporting a plurality of longitudinally spaced parallel rollers 152. The conveyor 150 is aligned with the top surfaces of its rollers 152 in substantially the same plane as the top surfaces of the knock-out tray 35 so that the operator of the apparatus lifts each case from the conveyor to the knock-out tray with a minimum of effort.

The conveyor 41 includes a vibrating type trough 160 along which each battery case body portion 34b moves after severance of the top 34a. The trough is supported on a plurality of the vibrator bars 140 secured to the trough by the brackets 141, as previously described in connection with the vibrating conveyor 40. The vibrating bars are connected with cross members 142 supported between the channel bars 143. The conveyor 160 is supported over the cutting unit extending generally parallel with the conveyors 40 and 150 and positioned above the unit with a front edge of the conveyor generally aligned with the blade 42 when the blade is at its lower cutting position, FIGURE 4. The channel members 143 of the conveyor 160 are supported above the cutting unit on a plurality of vertical members 162 secured along the outside surfaces of the frame side members 61, FIGURE 2. The conveyor 41 functions in the same manner as the conveyor 40 and includes a power unit, not shown, for vibrating the conveyor to move the battery case body portions 34b along its trough 160 for washing them and moving them to a disposal area, not shown. Spaced along the trough 160 from the cutting unit 20 is the washing unit 41a at which the trough is longitudinally slotted along a portion 161a which is partially enclosed by a washer cover 163 secured along its flanges 163a to the trough. A plurality of laterally positioned perforated wash pipes 164 are secured in parallel spaced relationship below the slotted portion 161a of the trough. The wash pipes are supported through side bar members 165 secured along opposite bottom edges of the trough 160 and connected at one end into a header pipe 166 which communicates with a flexible water supply hose 170 through a coupling 171. The flexible hose 170 extends to a source of water under pressure, not shown, for supplying water to wash the battery case portions. The perforations in the pipe sections 164 open upwardly so that water forced through them sprays upwardly within the washer cover 163 to clean the battery case body portions. A drain pan 171 having an upper open ended funnel portion 171a is positioned beneath the slotted portion 161a of the trough below the pipe sections 164 to receive the waste water employed in cleaning the battery case body portions. The funnel portion 171a of the drain pan is supported on a hollow base portion 171b which conducts waste water into a drainage system, not shown. The wash pipes 164 along with the header 166 and coupling 171 are rigidly secured to the trough 160 and thus vibrate with it. The drain pan 171, however, is not physically connected with the trough so that the trough vibrates relative to it.

A battery case 34 to be processed by the apparatus of the invention is placed on the conveyor 150 in a vertical position, FIGURE 1, to the right of the cutting unit with respect to an operator facing the cutting unit as in FIGURE 3 standing in general alignment with the blade 42. The battery case moves toward the cutting unit on the roller conveyor until it is substantially aligned with the stop plate 75. The operator lifts the battery case from the conveyor 150 toward the stop plate 75. The battery case is manually rotated by the operator 90 degrees toward the stop plate so that the terminals 34d on the top of the battery case extend toward the stop plate and the side face of the battery on the side of the battery away from the operator adjacent to the cutting unit is substantially parallel with the top surface of the knock-out tray 35. The battery case is placed on the knock-out tray with its terminals 34d engaged with the front face of the stop plate 75, FIGURE 1. During the step of positioning the battery case on the knock-out tray against the stop plate the blade assembly 21 is at its upper position as the spring biased hydraulic valve 31 is at its first position conducting hydraulic fluid from the pump 32 through the conduit 118 into the lower portion of the unit 22 below its piston 22b.

With the battery case thus positioned against the stop plate 75, the foot pedal assembly 30 is operated by the foot of the operator depressing the foot pedal 130 moving the hydraulic valve 31 by means of the push rods 135 and 139. The hydraulic valve is shifted to its second position at which hydraulic fluid from the pump 32 flows through the conduit 117 into the cylinder 22a above the piston 22b forcing the piston downwardly to move the blade frame downwardly through its cutting stroke. When the valve 31 effects communication between the supply conduit 112 and the conduit 117 it also establishes fluid communication between the conduit 118 and the return conduit 123 so that the hydraulic fluid within the cylinder below the piston is returned through the conduits 118 and 123 to the tank 101. The frame 21 is forced downwardly pivoting about its shaft 53 with the blade 42 moving through an arcuate path about the axis of the shaft 53. The blade frame moves downwardly until the lower cutting edge 42a of the blade engages the upper side surface of the battery case cutting into the case along a slightly arcuate path. The blade cuts the battery case and the terminals of the battery between the inside face of the top of the case leaving the lead battery plates within the case body portion. The arcuate path followed by the blade is spaced in front of the stop plate 75 sufficiently that the battery case body is cut at a location along the case which insures complete severance of the top portion of the case so that the battery plates are readily removed from the case. The blade moves downwardly through its cutting stroke until the side members 43 of the blade frame engage the upper edge surfaces of the opposite end portions 75b of the stop plate 75, FIGURE 4, at which position the end portions 75b are each received within the recess 43a of the adjacent side member of the blade frame. At the lower end position of the blade at the end of its cutting stroke, FIGURE 4, the blade frame is slightly below the horizontal position and the blade is moved beyond the vertical position so that it slants downwardly toward the stop plates 75 with the lower portion of the blade being closer to the stop plate than its upper portion. When the blade is at the lower end of its cutting stroke its lower cutting portion 42a extends into the slot 81 insuring that the blade cuts completely through the battery case. Since the blade moves through and slightly beyond the vertical position in an arcuate path the severed top portion 34a of the battery case is slightly crushed between the back face surface of the blade and the front face of the stop plate 75 thus providing clearance for the blade on its return stroke to minimize any tendency to wedge the blade against the severed top portion of the battery case.

When the blade reaches the end of its cutting stroke having passed completely through the battery case to the position shown in FIGURE 4, the operator releases the foot pedal 30 so that the spring in the valve 31 returns the valve to its first position communicating the conduit 117 with the return line 123 and the conduit 118 with the supply line 112 from the pump so that the piston 22b is pumped upwardly in the cylinder lifting the blade and blade frame through its return upward stroke. During the initial phase of its return stroke the blade moves through an arcuate path upwardly and away from the stop plate 75 thereby minimizing any tendency of wedging action between the severed top portion 34a of the battery case and the blade and stop plate. As the blade moves upwardly the severed top portion of the battery case is released and falls downwardly through the slot 81 against the plate 83 which deflects the top portion into the channel portion 40a of the conveyor trough.

When the top is severed from the battery case some of the electrolyte remaining in the battery generally spills out into the conveyor 40. With the top portion 34a of the battery case removed, the body portion 34b is manually lifted with its open top end turned downwardly. The battery plates 34c along with other loose materials including some of the "mud" in the case which has salvageable chemicals therein are emptied downwardly through the slotted knock-out tray into the conveyor 40. The vibratory action of the conveyor moves the top portion, the plates, and the other materials from the battery along the conveyor from the vicinity of the battery case opener to facilities, not shown, for further processing of the plates, top portions and other materials to recover valuable metals, such as lead, and chemicals of value.

After the battery case is emptied, its body portion 34b is lifted by the operator to the conveyor 160 on which it is placed in inverted position with its open top end oriented downwardly on the conveyor, FIGURE 6. The conveyor moves the battery case into the washer cover 163 along the slotted portion 161a of the conveyor where upwardly directed streams of water from the wash pipes 164 rinse the case to remove acid and "mud" which may remain within it. The wash water is deflected by the washer cover and the battery case portion 34b back downwardly into the funnel portion 171a of the drain pan through which the water drains downwardly through the support section 171b to disposal and processing facilities, not shown. The wash water effluent is treated to recover any chemicals, metals, and other materials of value. The case moves through the washing section continuing along the conveyor to disposal facilities. The section 161a along with the wash pipes vibrates with the remainder of the conveyor so that there is no interruption in the process for the washing step.

Thus, apparatus embodying the invention for recovering salvageable materials from batteries provides facilities for: moving a battery into alignment with battery case cutting means; for cutting a top portion of the battery case from the remaining portion of the case; for receiving and transporting the severed top portion, plates and other materials removed from the case from the vicinity of the apparatus; for washing the battery case base portion; and for moving the base and top portions of the case and the plates from the vicinity of the apparatus to further processing and disposal facilities.

It will now be seen that a new and improved battery salvage apparatus and method has been described and illustrated.

It will be further seen that a new and improved battery cutting apparatus has been described and illustrated.

It will be further seen that a new and improved battery cutting apparatus has been described and illustrated.

It will be seen that the apparatus includes cutting means for severing a top portion of the case of a battery from the remaining portion of the case to permit removal of the battery plates and other materials of value from the case.

It will also be seen that the cutting means is a power operated blade assembly which moves through arcuate cutting and return paths about a longitudinal axis extending substantially parallel to the top face of a battery processed by the apparatus.

It will be further seen that the cutting blade and its support frame are so pivoted and oriented that the arcuate path of the blade during its cutting stroke moves the blade beyond a vertical position so that at the end of the cutting stroke the blade is slanting toward the severed top portion of the battery case with a lower portion of the blade being closer to the top portion of the case than the upper portion of the blade so that the blade moves on its return stroke upwardly and away from the severed top portion thereby minimizing the probability of wedging action between the blade and battery case top portion which might hinder free movement of the blade on its return stroke.

It will also be seen that the apparatus includes bracket connecting means extending below a frame supporting the cutting blade so that a maximum length hydraulic piston suspended from above the cutting blade frame may be used to provide the force for actuating the cutting blade through its cutting and return stroke.

It will also be seen that apparatus embodying the invention includes means for conveying a battery case to a cutting unit of the apparatus, means for cutting one portion of a battery case from another portion thereof, means for receiving a severed portion of the battery case and plates removed therefrom and conveying them from the vicinity of the cutting operation, means for receiving the emptied case portion of the battery case, and means associated with the last mentioned means for washing the base portion of the case while moving it from the vicinity of the cutting operation to disposal facilities.

It will also be seen that the method of the invention includes moving a battery case to the vicinity of cutting means, positioning the battery case at a predetermined location relative to the cutting means, forcing the cutting means through the battery case to sever a top portion from a remaining base portion of the battery case, emptying plates from within the base portion of the battery case, positioning the battery case base portion on conveyor type washing means, washing the battery case base portion and moving it to an area remote from the cutting apparatus, and conveying the severed top portion and plates of the battery from the vicinity of the cutting operation.

Figure 7:
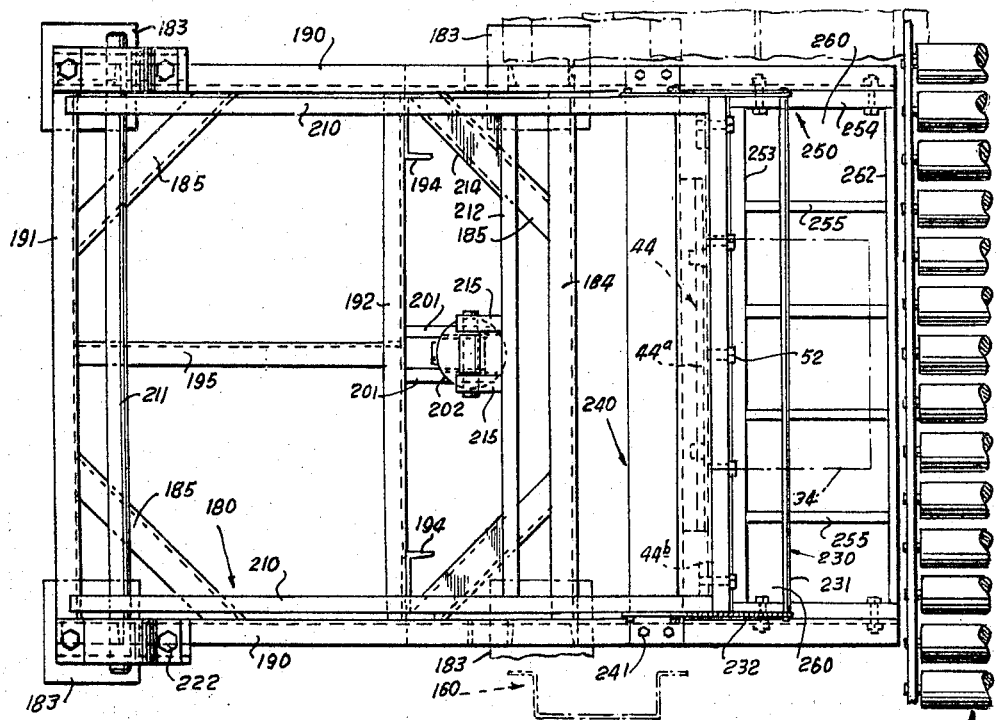
FIGURE 7 is a top fragmentary view in elevation of an alternate form of cutting unit employed in the battery case opener.
Figure 8:
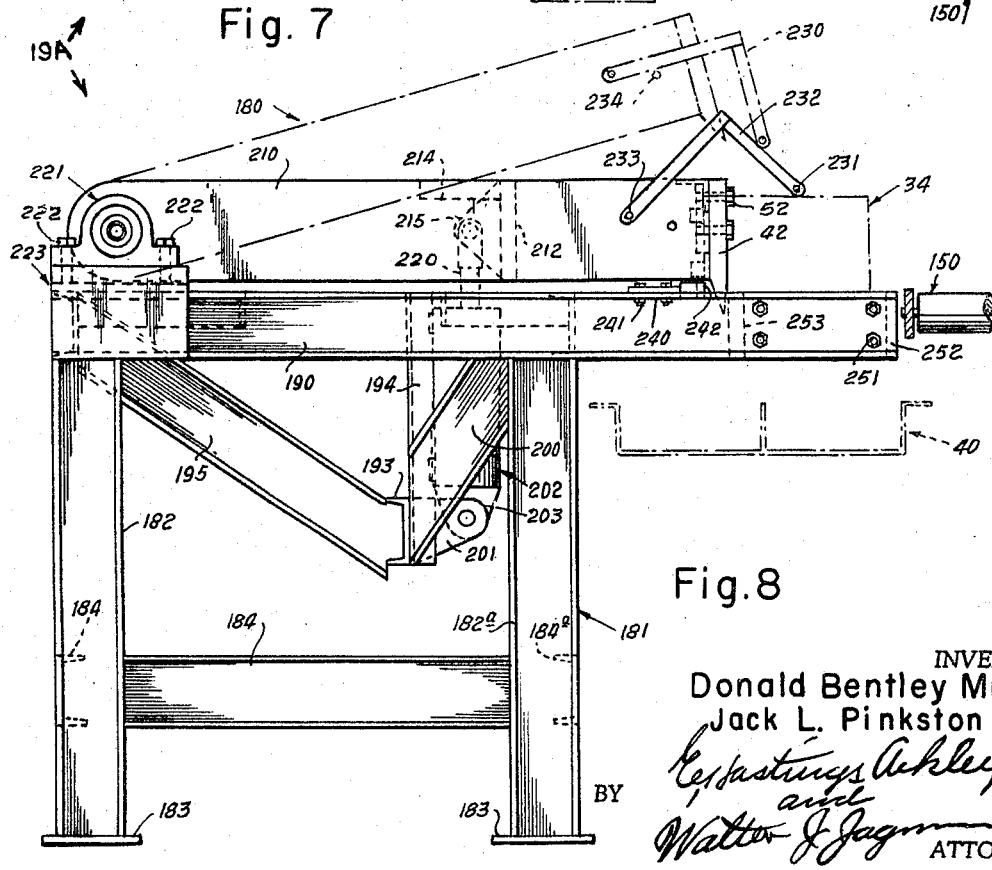
FIGURE 8 is a fragmentary end view in elevation and section of the cutting unit of FIGURE 7.

An alternate form of cutting unit 19A is illustrated in FIGURES 7 and 8 wherein identical components and functional assemblies are referred to by the same reference numerals employed in the description above and in FIGURES 1–6. A blade frame 180 is pivotally supported on a base frame assembly 181 for reciprocating arcuate movement through cutting and return strokes. The frame assembly 181 includes vertical legs 182 supported on base pads 183 and interconnected by lower cross braces 184. The cross braces 184 are interconnected by corner angle braces 185, FIGURE 7. A pair of top horizontal support beams 190 are secured in parallel spaced relationship to the tops of the front and back legs, extending forward substantially beyond the front legs 182a and interconnected by horizontal parallel, spaced, cross members 191 and 192. A horizontal bracket support member 193 is suspended from vertical spaced members 194 which are secured along top portions to the cross brace 192. An angle brace member 195 extends downwardly and forwardly secured at its lower forward end to the member 193 and at its upper backward end to the member 191. Each vertical member 194 is braced along its outside edge by a downwardly and backwardly extending member 200 which is secured at its upper end into the connection between the top beam 190 and front leg 182 on the side of the frame where the member 194 is located and at its lower end to the outside face of the braced member 194. A pair of spaced parallel brackets 201, FIGURE 7, are centrally secured perpendicular to and on the front vertical face of the member 193 for holding the lower end of the hydraulic power unit 202 which has a flange portion 203 received between and pivotally pinned to the brackets 201.

The blade frame 180 includes a pair of spaced parallel side members 210 connected together by a round shaft 211 which extends beyond opposite outside surfaces of the side member, a central cross member 212, and a front cross member 44. The member 44 comprises a cross bar 44a and side vertical members 44b, FIGURE 3, which interconnect the forward ends of the side members 210 and support the blade r2. A triangular shaped gusset or reinforcing member 214 is secured between each opposite end portion of the cross member 212 along its back face and the inside face of the adjacent side member 210. A pair of spaced brackets 215 are secured on the back face of the cross member 212. The upper end of a piston rod 220 connected with a piston, not shown, within the unit 202 is received between and pivotally secured to the brackets 215 to permit the piston rod to move the blade frame through its cutting and return strokes.

The shaft 211 is supported along its opposite end portions in conventional pillow block type bearing assemblies 221 each of which is secured by bolts 222 to a base assembly 223 suitably secured as by welding to the beams 190. The bearings 221 permit the shaft to revolve around its longitudinal axis so that the blade frame 180 is moved through its cutting and return strokes.

A safety bar assembly 230 is pivotally secured to the blade frame to help keep the hands of an operator from being caught in the path of the blade 42. The safety bar assembly comprises a horizontal bar 231 supported at opposite ends by a pair of identical spaced angle members 232 each of which is pivotally secured by a pin 233 to an adjacent frame side member 210. The stop pin 234 is secured in and extends outwardly from the side surface of each of the side members 210 below the angle brackets 232 to hold the safety bar assembly against downward rotation beyond the position illustrated in the broken line representation of the safety bar in FIGURE 8 so that the bar 231 is held slightly below but clear of the cutting edge of the blade 42 when the blade frame is above the beginning of its cutting portion of its downward stroke. Thus, the safety bar assembly does not become wedged between a battery case and the cutting blade as the cutting balde comes downwardly approaching the battery case. When the blade engages a battery case the bar 230 of the safety bar assembly rests on the upper side surface of the battery case holding the safety bar assembly clear of the blade as it moves downwardly through a battery case, FIGURE 8.

A substantially flat horizontal battery stop assembly 240 is secured at opposite ends by bolts 241 to the beams 190 below the front end portion of the blade frame aligned with the blade 42. The battery stop has a forward edge surface 242 aligned substantially parallel to and spaced from the cutting edge of the blade so that when a battery case 34 is positioned with its terminals engaging the surface 242 the blade cuts into and through the battery case at the proper location to completely sever the top portion of the battery case from its body portion for removal of its plates. The stop 240 also functions to limit the downward stroke of the blade frame assembly. As the assembly moves downwardly on its shaft 211 the lower edge surfaces of the side members 210 of the frame assembly engage the top surfaces of the stop 240.

The front end portions of the beams 190 are coupled together by a knock-out tray assembly 250 secured by bolts 251 within the end portions of the beams. The knock-out tray comprises front and back members 252 and 253, respectively, interconnected by end members 254 and intermediate spaced parallel members 255 suitably secured together as by welding. The back face of the member 253 is aligned substantially parallel with the cutting edge of the blade 42 forward of the blade sufficiently for the blade to clear the member to move downwardly to the position illustrated in FIGURE 8.

The front face 242 of the battery stop 240 and the back face of the knock-out tray member 253 define a slot through which the severed top portion of a battery cut by the blade falls downwardly into the conveyor 40. Thus the stop 240 and member 253 are positioned with the face 242 and the back face of the member 253 spaced substantially the thickness of the top portion of the battery case including the height of its terminals. The side, end, and intermediate members forming the knock-out tray define spaced slots 260 through which the battery plates 34c are dumped from the base portion of the case after its top portion has been severed by the blade.

The cutting unit 19A is employed with the hydraulic power system, the foot pedal assembly 30 and related apparatus such as the washer system 41a, such auxiliary equipment having been previously described and illustrated in FIGURES 1-6.

The cutting unit 19A processes a battery case in the same manner as previously described in connection with the cutting unit 19. A battery case is moved into alignment with the knock-out tray 250 where it is placed by the operator on its side with its top moved toward the battery stop surface 242 until the battery terminals on the case engage the surface 242. The controls of the hydraulic system are actuated causing the piston rod 220 to be drawn downwardly pulling the blade frame 180 with its blade 42 downwardly against the top side surface of the battery case 34 and moving the blade through the battery case to sever the top portion of the case. The blade moves downwardly to the lower end of its cutting stroke, FIGURE 8, severing the top portion of the battery case from its main body portion. As the blade engages and moves downwardly through the battery case the safety guard rod 231 comes to rest on the top side surface of the battery case and the pivotal connection between the angle end members 232 of the safety bar allows the bar assembly to pivot relative to the blade frame so that when the blade has cut through the battery case the safety bar is at the position shown in FIGURE 8. The control pedal of the hydraulic system is released so that fluid flow into the hydraulic unit 202 is reversed returning the blade frame upwardly to the position illustrated by the broken line representation of the frame in FIGURE 8. As the frame moves upwardly, the safety bar returns downwardly relative to the frame to the position shown against its stop pins 234. The severed top portion of the battery case falls downwardly through the slot between the battery stop and the member 253 of the knock-out tray into the conveyor 40. The body portion 34b of the battery case is placed on the conveyor 160 for washing and disposal after its plates and other materials are emptied through the knock-out tray.

It will now be seen that an alternate form of battery case opener has been described and illustrated including a cutting unit having a hydraulic power unit supported below its blade frame assembly.

It will be further seen that the modified form of cutting unit has a pivoted hand guard to protect the hands of an operator from the blade of the unit.

It will be evident that numerous variations and modifications within the scope of the invention may be made in the above described and illustrated apparatus. For example, the shaft 53 of the cutting unit 19 may be supported on various structures such as the pillow block type bearings shown in the cutting unit 19A secured to the side vertical frame members 63. It will also be evident that other power systems for moving the blade frames through their cutting and return strokes may be used in lieu of the hydraulic type system illustrated. For example, power transmission between each blade frame and an electric motor or other prime mover may be effected through various types of gear connections.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. Apparatus for cutting a top portion of a storage battery case from a body portion thereof to permit removal of plates and other materials from within said case, said apparatus comprising: frame means including tray means for supporting a battery case at a predetermined position thereon; stop plate means secured on said frame means providing a surface facing said tray means for engagement by a portion of said battery case to align said case at said predetermined position on said tray means; blade means movably supported from said frame means for limited movement along an arcuate path passing between said stop plate means and said tray means whereby said blade on its cutting stroke passes through a battery case located at said predetermined position; arm means rotatably connected at one end on a shaft mounted on the opposite side of said stop plate means from said tray means along an axis substantially parallel to a longitudinal centerline of the top front face of a battery case held at said predetermined position on said tray means and connected at the opposite end to said cutting blade for moving said cutting blade through said arcuate path; and power means operatively connected with said blade for moving said blade along said arcuate path.

2. Apparatus as defined in claim 1 wherein said blade is adapted to move along said arcuate path passing through a position of substantial parallel relationship with the front face of the top portion of said battery case to an end position at which said blade slopes toward said front face of said top portion with the cutting edge portion of said blade being closer to said top surface than the remaining portions of said blade.

3. Apparatus as defined in claim 1 wherein said power means comprises a hydraulic unit connected with said arm means.

4. A storage battery case opener for removing a top portion of a storage battery case from a body portion thereof to permit removal of plates and other materials from said case comprising: a frame; a battery case supporting tray secured to said frame for supporting a battery case while said top portion of said case is severed from said body portion; a stop plate secured to said frame, said stop plate having a surface facing said tray for engagement by a portion of a battery case supported on said tray to locate said case at a predetermined position; said frame, said stop plate, and said tray having portions defining a slot extending along said stop plate between said plate and said tray for passage of said top portion of said battery case downwardly therethrough after severance from said body portion; a blade movable along a limited arcuate path passing between said stop plate and said tray through said slot between said plate and said tray spaced from said stop plate sufficiently that said blade cuts through a battery case located on said tray against said stop plate along a predetermined path to sever said top portion of said battery case whereby plates and other materials within said case are removable therefrom, the lower cutting edge of said blade being movable into said slot between said tray and said stop plate to a level below the top edge surfaces of said tray; arm means secured at one end to said blade for supporting said blade for movement through said arcuate path; shaft means secured to said frame on the opposte side of said stop plate from said tray and rotatably connected with the other end of said arm means for pivotally supporting said arm means for movement of said blade along said arcuate path, said shaft having a longitudinal axis extending substantially parallel to the longitudinal centerline of said front face of said stop plate; and power means connected between said frame and said arm means for moving said arm means through said arcuate path.

5. The apparatus of claim 4 wherein said arm means comprises substantially parallel spaced members secured at the front end thereof with said blade and at the back end thereof with said shaft.

6. The apparatus of claim 5 wherein said power means comprises a hydraulic unit having a cylinder and a piston reciprocable therein.

7. Apparatus as defined in claim 6 wherein said hydraulic unit is supported at an upper end from said frame and is connected at a lower end with said arm means.

8. Apparatus as defined in claim 7 wherein said hydraulic unit is supported at a lower end thereof from said frame and is connected at an upper end with said arm means.

9. Storage battery salvage apparatus for removing a top portion of a battery case from a body portion thereof and removing plates and other materials from within said body case, said apparatus comprising: a main frame including spaced side members; a battery case supporting tray secured across the front of said main frame, said tray comprising members having edge surfaces aligned in a plane to support a battery case and spaced to provide openings therethrough to allow passage of plates and other materials from said battery; a stop plate secured along a front portion of said side members of said main frame spaced from said tray, said stop plate having a front surface for engagement with said battery case to position said case on said tray at a predetermined location, said front face of said stop plate defining a back side of a slot provided along the length of said plate between said tray and said plate to permit passage downwardly therethrough of said top portion of said battery case when severed from said body portion; a blade frame including spaced substantially parallel side arms; a blade having a lower cutting edge secured across the front ends of said side arms; a shaft secured to said main frame and said side arms of said blade frame for pivotal movement of said blade frame, said shaft extending horizontally between side members of said main frame substantially parallel with and spaced behind said front face of said stop plate and aligned horizontally at a height between the upper and lower side surfaces of a battery positioned at said predetermined location on said tray whereby said side arms of said blade frame are pivotally supported for movement along a limited arcuate path guiding said blade along an arcuate path extending through said slot between said tray and said stop plate, said path being spaced in front of said stop plate a distance determined by the thickness of said top portion of said battery case to be severed by said blade; said side arms of said blade frame and said stop plate having coengaging surfaces limiting the downward travel of said blade frame; said blade moving along said arcuate path downwardly through a vertical position to a lower end position at which said lower cutting edge of said blade extends into said slot between said stop plate and said tray below the top edge surfaces of said tray and said blade slants downwardly toward said stop plate; a hydraulic power unit secured at one end to said blade frame and supported at the other end from said frame; means for supplying fluid under pressure to said hydraulic unit; and means for controlling the flow of said fluid to said hydraulic unit to operate said unit along said arcuate path through both cutting and return strokes.

10. Apparatus as defined in claim 9 wherein said hydraulic unit is supported on said main frame above said blade frame.

11. Apparatus as defined in claim 9 wherein said hydraulic unit is supported on said main frame below said blade frame.

12. Storage battery salvage apparatus as defined in claim 9 including: first conveyor means aligned substantially with the top and in front of said tray for transporting battery cases to a position in front of said stop plate; second conveyor means positioned below said tray for transporting plates removed from body portions of batteries and severed top portions of battery cases away from the area of said tray; and third conveyor means positioned above said main frame with a front portion substantially aligned with the back of said tray for transporting battery case body portions from the area of said tray.

13. Storage battery salvage apparatus as defined in claim 12 including battery case washing means associated with said third conveyor means for continuous washing of battery case body portions moving along said third conveyor means.

14. A system for removing salvageable materials from a storage battery case comprising: means for transporting a storage battery case to a predetermined location; means at said predetermined location for dismembering said storage battery case to remove a top portion of said case to permit withdrawal of plates and other materials from within said case; means for supporting said battery case at a predetermined position; cutting means operatively associated with said supporting means including a blade movable through cutting and return strokes along an arcuate path intersecting said battery case held on said supporting means at a predetermined position; means for moving said blade through said cutting and return strokes; conveying means for receiving said top portion of said battery case, said plates, and said other materials and conveying same from said predetermined location to disposal and processing facilities for recovering metals, chemicals and other materials of value; means for conveying said case of said battery from said predetermined location to facilities for disposal of said cases; shaker and wash means operatively associated with said means for conveying said cases for washing said cases during movement by said conveying means to remove chemicals and other materials of value from said cases including means for collecting effluent wash water and conducting said wash water to facilities for processing and recovery of chemicals and other materials of value from said wash water.

References Cited

UNITED STATES PATENTS

| | | | |
|---|---|---|---|
| 2,119,859 | 6/1938 | Eppensteiner | 136—174.4 |
| 2,567,542 | 9/1951 | Blake | 136—174 |
| 2,871,939 | 2/1959 | Close | 83—610 XR |
| 3,152,504 | 10/1964 | Brown | 29—204 XR |

WINSTON A. DOUGLAS, *Primary Examiner.*

D. L. WALTON, *Assistant Examiner.*

U.S. Cl. X.R.

29—204; 83—610; 14—305